United States Patent [19]
Kubo et al.

[11] Patent Number: 5,311,347
[45] Date of Patent: May 10, 1994

[54] OPTICAL COMMUNICATION SYSTEM WITH AUTOMATIC GAIN CONTROL

[75] Inventors: Susumu Kubo; Katsuo Suzuki; Atsuhiko Utsumi, all of Kawasaki, Japan

[73] Assignee: Fujitsu Limited, Japan

[21] Appl. No.: 906,583

[22] Filed: Jun. 30, 1992

[30] Foreign Application Priority Data

Jul. 1, 1991 [JP]  Japan .................. 3-186910

[51] Int. Cl.$^5$ .................. H04B 10/02; H04B 10/00
[52] U.S. Cl. .................. 359/176; 359/174; 359/161; 359/177; 359/173
[58] Field of Search ............... 359/176, 109, 174, 175, 359/161, 187, 177, 173, 178

[56] References Cited

U.S. PATENT DOCUMENTS

| | | | |
|---|---|---|---|
| 4,504,976 | 3/1985 | Beaudet | 359/187 |
| 5,065,456 | 11/1991 | Nakayama | 359/187 |
| 5,117,196 | 5/1992 | Epworth et al. | 359/174 |

FOREIGN PATENT DOCUMENTS

| | | | |
|---|---|---|---|
| 0440276 | 8/1991 | European Pat. Off. | |
| 2-299329 | 12/1990 | Japan | H04B 10/08 |

Primary Examiner—Richard E. Chilcot, Jr.
Assistant Examiner—Richard Moller
Attorney, Agent, or Firm—Greer, Burns & Crain

[57] ABSTRACT

In an optical communication system formed by terminal stations, optical repeaters provided between terminal stations, and optical fiber cables connecting between terminal stations through optical repeaters, the system includes: an optical wavelength multiplexer provided in a terminal station to multiplex a first optical signal having a wavelength $\lambda 1$ with a second optical signal having a wavelength $\lambda 2$; an optical wavelength demultiplexer provided in the terminal station to demultiplex the first optical signal from the second optical signal; plural optical repeaters, each having a unit for amplifying the first and second optical signals in accordance with a level of the second optical signal separated from the first optical signal.

6 Claims, 5 Drawing Sheets

OPTICAL COMMUNICATION SYSTEM WITH AUTOMATIC GAIN CONTROL

BACKGROUND OF THE INVENTION

1. Field of the Invention

The present invention relates to an optical communication system. More particularly, it relates to an improvement of an optical communication between terminal stations connected by an optical fiber cable through plural optical repeaters each connected in series. The present invention is advantageously used in an optical submarine cable system.

2. Description of the Related Art

Recently, an optical communication system using an optical fiber cable has been widely used in a various communication systems, for example, optical submarine cable systems. Optical fiber cables enable high speed and extensive data transmission. Further, plural optical repeaters are provided for every predetermined interval (distance) on the optical submarine cable to amplify an optical signal to be transmitted.

SUMMARY OF THE INVENTION

The object of the present invention is to provide an optical communication system enabling a constant output level of the optical signal in the terminal station.

In accordance with the present invention, there is provided an optical communication system formed by terminal stations, optical repeaters provided between terminal stations, and optical fiber cables connecting the terminal stations through the optical repeaters. The system includes:

an optical wavelength multiplexer provided in a terminal station to multiplex a first optical signal having a wavelength $\lambda 1$ with a second optical signal having a wavelength $\lambda 2$;

an optical wavelength demultiplexer provided in the terminal station to demultiplex the first optical signal from the second optical signal;

plural optical repeaters, each having a unit for amplifying the first and second optical signals in accordance with a level of the second optical signal separated from the first optical signal.

In a preferred embodiment, the optical repeater includes: an optical amplifier for receiving the first and second optical signals and amplifying these signals; an optical splitter for obtaining a part of the first and second optical signals from the optical amplifier and passing through the remaining part of the first and second optical signals to the terminal station or the next optical repeater; and an automatic gain controller for generating a control signal to the optical amplifier in accordance with the level of the second optical signal filtered from the first optical signal.

In another preferred embodiment, the automatic gain controller has an optical filter for filtering the second optical signal from the first and second optical signals input from the optical splitter; an avalanche photo diode for converting the second optical signal into an electric signal, and a comparator for comparing the electric signal with a reference level to generate the control signal to the optical amplifier.

In still another embodiment, the wavelength $\lambda 2$ of the second optical signal is very close to the wavelength $\lambda 1$ of the first optical signal.

In still another embodiment, the first and second optical signals output from the optical repeater are controlled in accordance with the level of the second optical signal.

DESCRIPTION OF THE PREFERRED EMBODIMENTS

Before describing the preferred embodiments, an explanation of a conventional optical repeater will be provided below.

Figure 1:
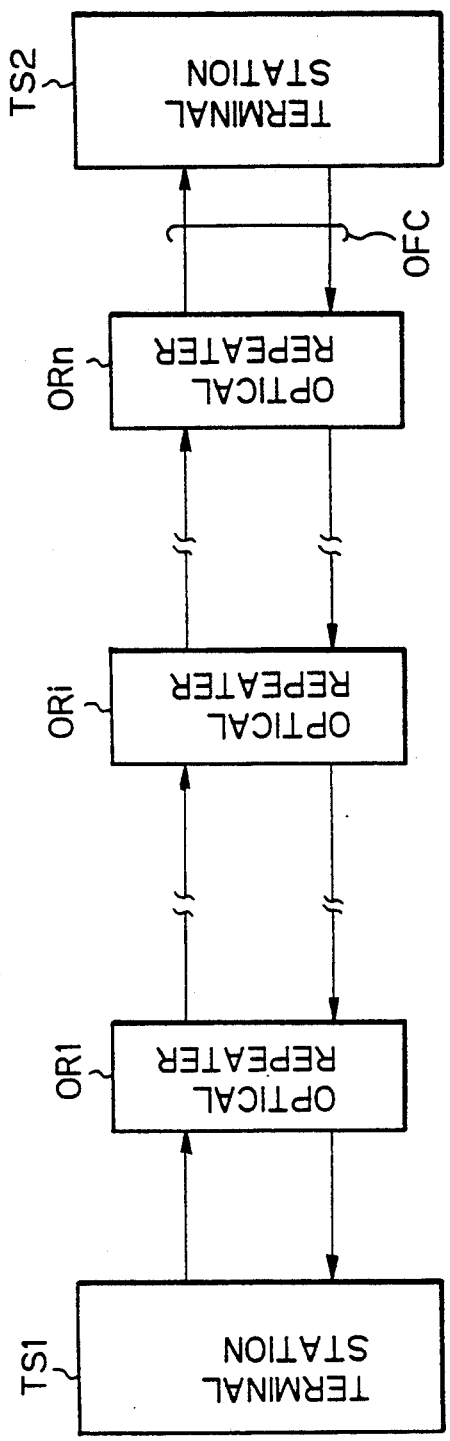
FIG. 1 is a schematic block diagram of an optical communication system.

FIG. 1 is a schematic block diagram of an optical communication system, particularly, an optical submarine cable system. In the drawing, TS1 and TS2 are terminal stations, and OR1 or ORn are optical repeaters each connected in series through optical fiber cables OFC. In the optical submarine cable system, the terminal stations TS1 and TS2 are provided on the ground, and the optical repeaters OR1 to ORn are provided on the bottom of the sea. In general, such an optical submarine cable system is bi-directional way and uses digitalized optical signals as a transmission signal.

Recently, according to the development of the optical communication, the distance between terminal stations has become longer so that it is necessary to provide many optical repeaters between terminal stations to amplify the optical signal attenuated by the optical fiber cable. That is, it is necessary to compensate the output level of the optical signal in the optical repeaters.

Figure 2:
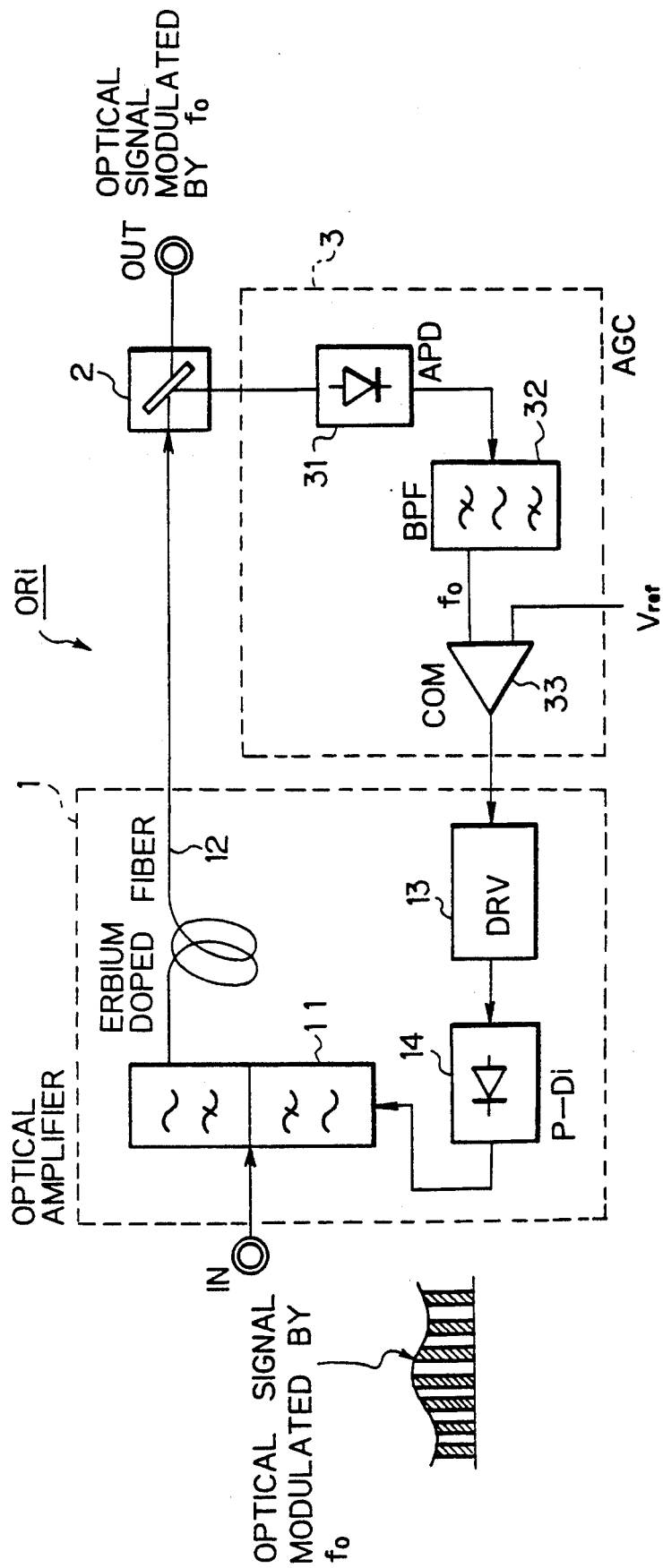
FIG. 2 is a schematic block diagram of a conventional optical repeater.

FIG. 2 is a schematic block diagram of a conventional optical repeater. In the drawing, reference number 1 denotes an optical amplifier for amplifying an input optical signal modulated by the frequency $f_0$, reference number 2 denotes an optical splitter for obtaining a part of the optical signal from the optical amplifier 1 and passing the remaining part of the optical signal to the next optical repeater, and reference number 3 denotes an automatic gain controller (AGC) for controlling the gain of the optical signal and generating a control signal to the optical amplifier 1.

Further, the optical amplifier 1 includes an optical mixer 11, an erbium doped fiber 12, a driver (DRV) 13, and a pump laser diode (P-Di) 14. The automatic gain controller 3 includes an avalanche photo diode (APD) 31, a band pass filter (BPF) 32, and a comparator (COM) 33.

The optical signal is modulated by the low frequency $f_0$, and this modulated signal is input from the terminal station or another optical repeater. Further, the modulated optical signal is amplified by the optical amplifier 1 and output to the next optical repeater. Accordingly, this system using an amplitude modulation is referred to as the "AM tone method" in the conventional art.

In FIG. 2, the optical mixer 11 receives the optical signal and this optical signal is light-pumped (light-excited) by the pump laser diode 14 in response to a control signal from the driver 13. The output from the optical mixer 11 is input to the optical splitter 2 through the erbium doped fiber 12. The erbium doped fiber 12 is provided within the optical repeater to amplify the optical signal. This erbium doped fiber is known in this field so a detailed explanation is omitted.

The optical splitter 2 divides the optical signal from the optical mixer 11 into two routes. As one route, a part of the optical signal is input to the avalanche photo diode 31, and as another route, the remaining part of the optical signal is sent to the next optical repeater or the end terminal station.

The avalanche photo diode 31 converts the separated optical signal into an electric signal which is sent to the band pass filter 32. The avalanche photo diode 31 is known in this field so a detailed explanation is omitted. The band pass filter (BPF) 32 only passes the modulation frequency $f_0$ from the electric signal. Further, the comparator (COM) 33 compares the level of the modulation frequency $f_0$ with a reference level $V_{ref}$, and generates the difference signal between these levels to the driver (DRV) 13.

The driver 13 outputs the control signal to the pump laser diode (P-Di) 14 in accordance with the difference between these levels. That is, when the level of the modulation frequency $f_0$ is lower than the reference level $V_{ref}$, the driver 13 outputs the control signal to the pump laser diode 14 to excite the optical signal. Accordingly, the output of the pump laser diode 14 is increased so that the input signal to the optical mixer 11 is light-pumped by the pump laser diode 14. Accordingly, it is possible to maintain the level of the optical signal.

There is, however, a problem in the conventional "AM tone method". That is, when the modulation frequency $f_0$ fluctuates under various factors on the optical fiber cable so that the level thereof becomes lower than the level of the reference level $V_{ref}$, the driver 13 outputs the control signal to the pump laser diode 14 so that the transmission signal is not controlled properly and the output level of the optical repeater is not maintained at a constant level.

Accordingly, the "optical wavelength multiplexing method" according to the present invention can maintain a constant output level from the optical repeater in contrast to the conventional "AM tone method" as explained in detail hereinafter.

Figure 3:
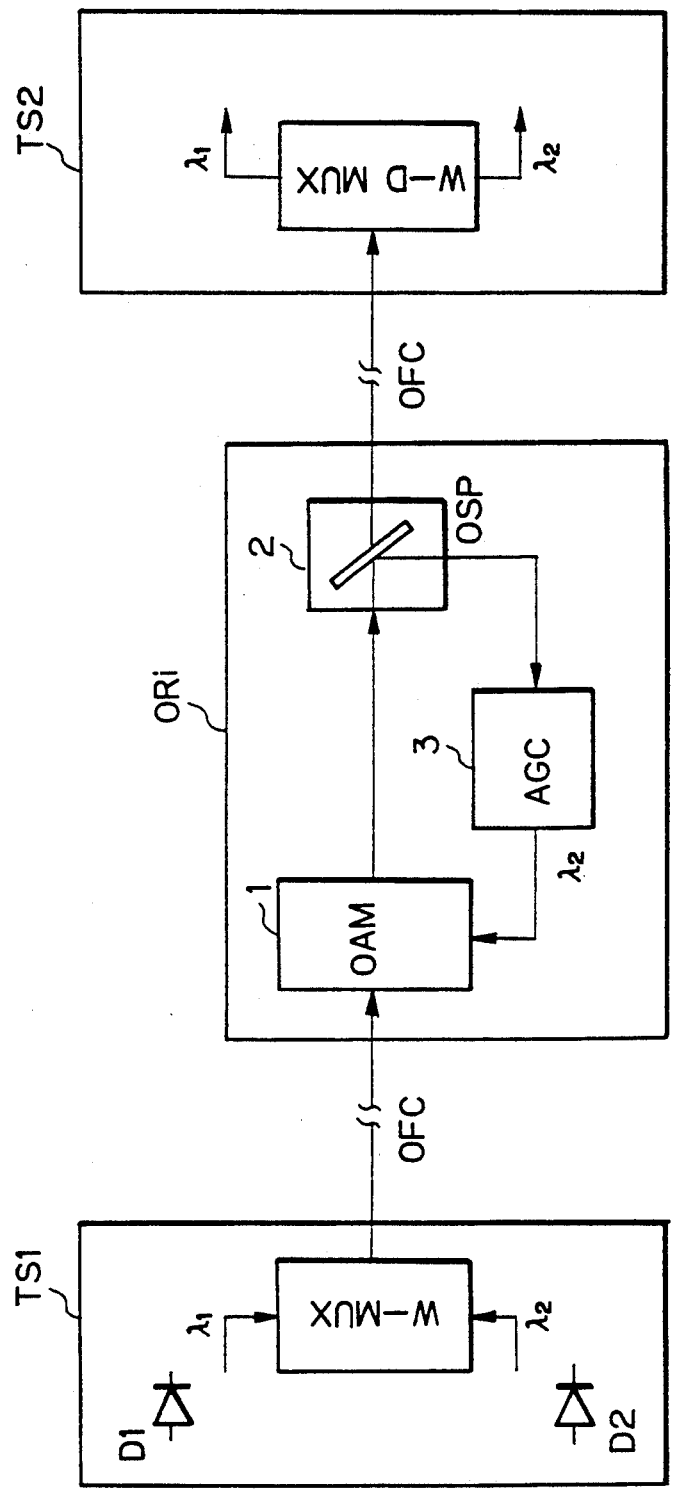
FIG. 3 is a basic block diagram of an optical communication system according to the present invention.

FIG. 3 is a basic block diagram of an optical communication system according to the present invention. In the present invention, each of the terminal stations TS1 and TS2 has an optical wavelength multiplexer W-MUX and an optical wavelength demultiplexer W-DMUX, and the former is provided to transmit the first and second optical signals, and the latter is provided to receive the first and second optical signals. As shown in the drawing, although only one-way is shown from the terminal station TS1 to the terminal station TS2, it is possible to transmit the optical signal bi-directional because the same optical wavelength multiplexer W-MUX and the optical wavelength demultiplexer W-DMUX are provided in the terminal stations TS1 and TS2.

Further, in the present invention, two signals, i.e., a main and level control signal, are provided for transmission of the optical signal. That is, the main signal sending the first optical signal has the wavelength $\lambda 1$, and the level control signal (second optical signal) has the wavelength $\lambda 2$ to control the level of the optical signal so that it is possible to maintain the constant output level in the optical repeater as explained below. In this case, the first diode D1 emits the first optical signal having the wavelength $\lambda 1$, and the second laser diode D2 emits the second optical signal having the wavelength $\lambda 2$. Further, the wavelength $\lambda 1$ is very close to the wavelength $\lambda 1$ and is slightly shorter than the wavelength $\lambda 2$ as shown in FIG. 4.

As shown in FIG. 3, the first and second optical signals having the wavelengths $\lambda 1$ and $\lambda 2$ are input to the optical wavelength multiplexer W-MUX in the terminal station of the transmission side, and these optical signals are output from the optical wavelength demultiplexer W-DMUX in the terminal station of the reception side. The optical signal having the wavelength $\lambda 2$ is called "level control signal" in the present invention.

The optical repeater ORi has an optical amplifier (OAM) 1 for amplifying the first and second optical signals, an optical splitter (OSP) 2 for obtaining a part of the first and second optical signals from the optical amplifier 1 and passing through the remaining part of the first and second optical signals to the next optical repeater, and an automatic gain controller (AGC) 3 for filtering the second optical signal having the wavelength $\lambda 2$ to control the gain of the optical signal and generating the level control signal to the optical amplifier 1. In the present invention, the gain control of the optical signal is performed based on the level control signal having the wavelength $\lambda 2$ in the automatic gain controller 3 as explained in detail hereinafter.

Figure 4:
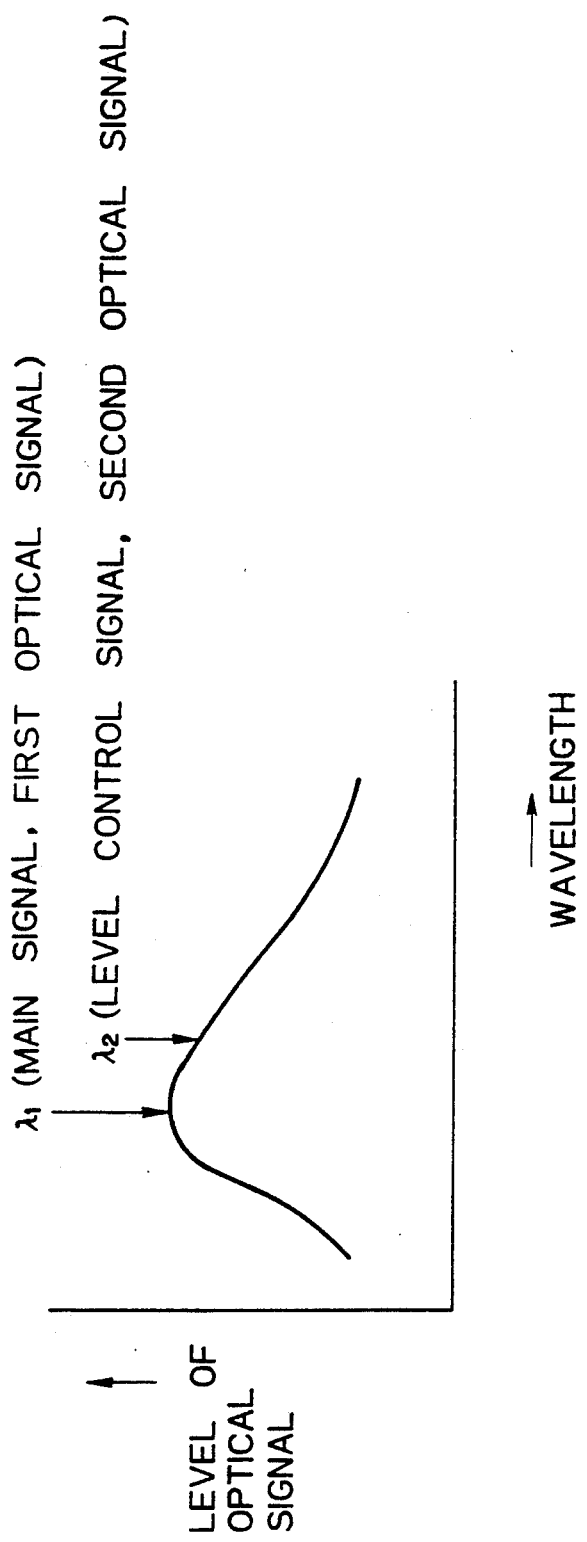
FIG. 4 is a view explaining the relationship between a level of an optical signal and a wavelength thereof.

FIG. 4 is a view explaining the relationship between the level of the optical signal and the wavelength thereof. The first laser diode D1 emits ON/OFF light having the wavelength $\lambda 1$ to send the first optical signal. Further, the wavelength $\lambda 2$ is set to a very close value of the wavelength $\lambda 1$. That is, the second laser diode D2 having the wavelength $\lambda 2$ is provided to emit the level control signal. In this case, the second laser diode D2 constantly emits a light (it is not an ON/OFF light) having the wavelength $\lambda 2$ to send the level control signal.

In this embodiment, the wavelength $\lambda 1$ is 1.55 $\mu$m and the wavelength $\lambda 2$ is 1.56 $\mu$m. That is, the wavelength $\lambda 2$ is very close to the wavelength $\lambda 1$ because the level of the optical signal is considerably reduced when the wavelength separation becomes greater.

Figure 5:
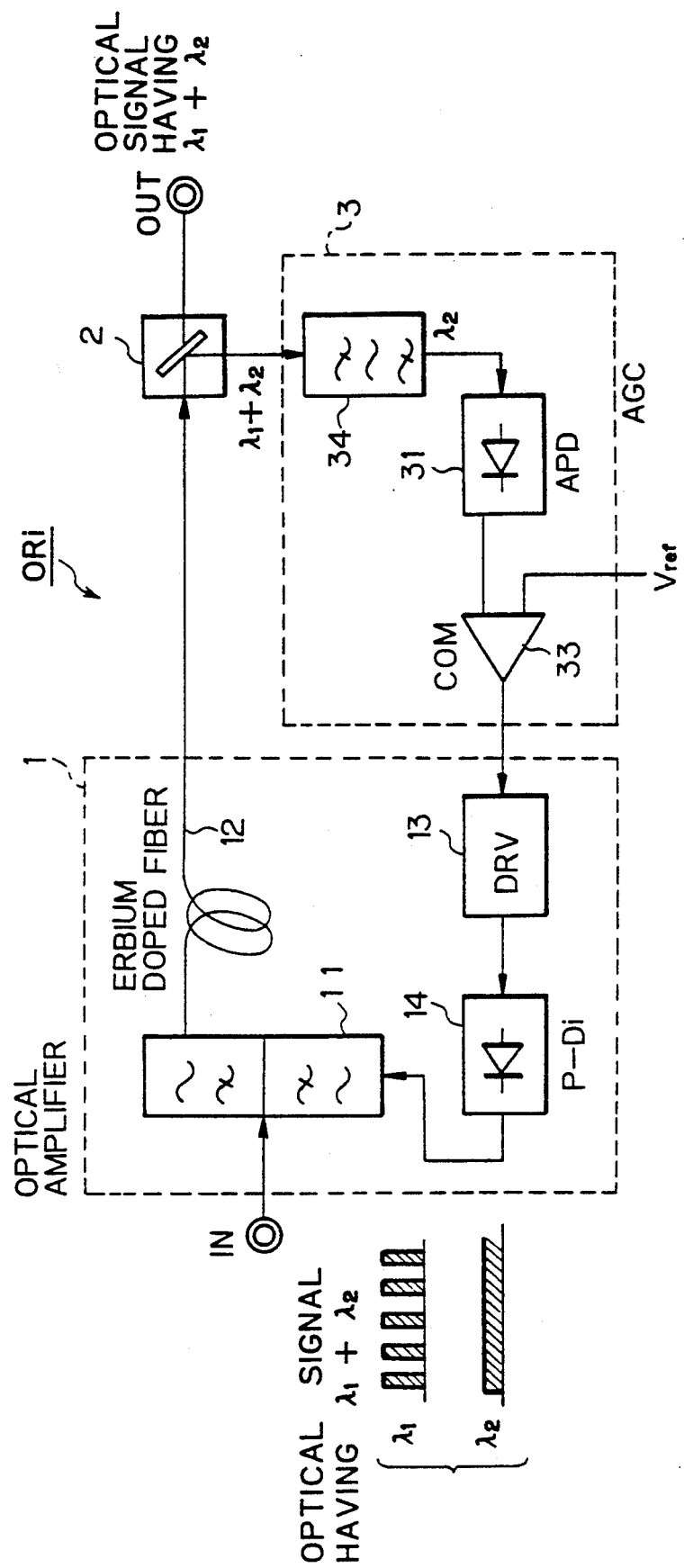
FIG. 5 is a schematic block diagram of an optical repeater according to the present invention.

FIG. 5 is a schematic block diagram of an optical repeater according to the present invention. In the drawing, the same reference numbers used in FIG. 2 are attached to the same components in this drawing. As explained above, reference number 1 denotes the optical amplifier for amplifying the first and second optical signals, reference number 2 denotes the optical splitter for obtaining a part of the first and second optical signals from the optical amplifier 1 and passing through remaining part of the first and second optical signals to the end terminal station or the next optical repeater, and reference number 3 denotes the automatic gain controller (AGC) for controlling the gain of the optical signal and generating a control signal to the optical amplifier 1.

Further, the optical amplifier 1 includes the optical mixer 11, the erbium doped fiber 12, the driver (DRV) 13, and the pump laser diode (P-Di) 14. The automatic gain controller AGC 3 includes the avalanche photo diode (APD) 31, the comparator (COM) 33, and an optical filter 34 to filter the level control signal having the wavelength λ2 from the first and second optical signals including wavelength λ1 and λ2. The avalanche photo diode 31 converts the second optical signal having the wavelength λ2 into the electric signal, and this electric signal is compared with the reference level $V_{ref}$ in the comparator 33.

As is obvious from the circuit arrangement of the automatic gain controller, the optical filter 34 is provided before the avalanche photo diode (APD) 31. This is the structural feature of the present invention.

The optical signal multiplexed by the main signal having the wavelengths λ1 and the level control signal having the wavelength λ2 is input from the terminal station or previous optional repeater. The optical mixer 11 receives the input signal and this input signal is light-pumped (light-amplified) by the pump laser diode 14 in accordance with the output of the driver 13. The output from the optical mixer 11 is input to the optical splitter 2 through the erbium doped fiber 12. As explained above, the erbium doped fiber 12 has an amplifying function of the optical signal based on the known art.

The optical splitter 2 divides the optical signal from the optical mixer 11 into two routes. As one route, a part of the first and second optical signals is input to the optical filter 34, and as another route, remaining part of the first and second optical signals are sent to next optical repeater or the end terminal station.

The optical filter 34 filters the second optical signal having the wavelength λ2 and sends it to the avalanche photo diode (APD) 31 to convert the second optical signal into the electric signal. The comparator 33 compares the level of the electric signal with the reference level $V_{ref}$, and generates the difference signal between these levels to the driver (DRV) 13.

The driver 13 outputs the control signal to the pump laser diode 14 in accordance with the difference signal between these levels. That is, when the level of the electric signal is lower than the reference level $V_{ref}$, the driver 13 outputs the control signal to the pump laser diode 14. Accordingly, the output of the pump laser diode 14 is increased so that the input signal to the optical mixer 11 is light-pumped by the pump laser diode 14.

Accordingly, it is possible to maintain the level of the optical signal. That is, when the level control signal (second optical signal) having the wavelength λ2 becomes smaller value, the difference between the electric signal and the reference level $V_{ref}$ becomes larger in the comparator 33 so that the input optical signal is light-pumped (light-excited) by the pump laser diode 14, and when the level control signal having the wavelength λ2 becomes larger value, the difference between the electric signal and the reference level $V_{ref}$ becomes smaller in the comparator 33 so that the optical signal is not light-pumped by the pump laser diode 14. Accordingly, it is possible to easily adjust the gain of the optical signal to a constant level because the level control is not dependent on the modulation frequency $f_0$.

In the preferred embodiment, a Pin photo diode is used as the avalanche photo diode 31, a model MB3607 is used as the comparator 33, a single mode PUMP WDM 1480/1550-J205122 is used as the optical mixer 11 and the optical splitter 2, and a single mode FF TYPE 1550 Step/1480 Pass is used as the optical filter 34. In this case, all parts are made by Fujitsu Limited.

We claim:

1. An optical communication system formed by terminal stations, at least one optical repeater provided between terminal stations, and optical fiber cables connecting the terminal stations through said at least one optical repeater, said system comprising:

an optical wavelength multiplexer provided in a first selected terminal station to multiplex a first optical signal having a wavelength (λ1) with a second optical signal having a wavelength (λ2);

an optical wavelength demultiplexer provided in a second selected terminal station to demultiplex the first optical signal from the second optical signal; and wherein said at least one optical repeater has means for amplifying the first and second optical signals in accordance with a level of the second optical signal separated from the first optical signal.

2. An optical communication system as claimed in claim 1, wherein said optical repeater comprises: an optical amplifier for receiving the first and second optical signals and amplifying these signals; an optical splitter for obtaining a part of the first and second optical signals from the optical amplifier and passing through the remaining part of the first and second optical signals to the terminal station or the next optical repeater; and an automatic gain controller for generating a control signal to the optical amplifier in accordance with the level of the second optical signal filtered from the first optical signal.

3. An optical communication system as claimed in claim 2, wherein said automatic gain controller comprises an optical filter for filtering the second optical signal from the first and second optical signals input from the optical splitter; an avalanche photo diode for converting the second optical signal into an electric signal, and a comparator for comparing the electric signal with a reference level ($V_{ref}$) to generate the control signal to the optical amplifier.

4. An optical communication system as claimed in claim 1, wherein said wavelength (λ2) of the second optical signal is very close to the wavelength (λ1) of the first optical signal.

5. An optical communication system as claimed in claim 1, wherein the first and second optical signals are output from the optical repeater such that the first optical signal is controlled in accordance with the level of the second optical signal.

6. An optical communication system as claimed in claim 3 wherein said automatic gain controller receives said first and said second optical signals, said signals being received by said band-pass filter and passed to said avalanche photo diode such that said comparator receives only said second optical signal from said band-pass filter.

* * * * *